United States Patent [19]

Darnell

[11] 4,234,551

[45] Nov. 18, 1980

[54] EUROPIUM CARBOXIDE AND METHOD OF PREPARING THE SAME

[75] Inventor: Alfred J. Darnell, Woodland Hills, Calif.

[73] Assignee: Rockwell International Corporation, El Segundo, Calif.

[21] Appl. No.: 32,058

[22] Filed: Apr. 23, 1979

Related U.S. Application Data

[63] Continuation of Ser. No. 812,022, Jun. 30, 1977, abandoned.

[51] Int. Cl.$^3$ .............................................. C01F 17/00
[52] U.S. Cl. .................................. 423/263; 423/415 R
[58] Field of Search ........................ 423/415, 417, 263

[56] References Cited

U.S. PATENT DOCUMENTS

1,841,973   1/1932   Naumann .............................. 423/417

OTHER PUBLICATIONS

Haschke et al., "Inorganic Chemistry", vol. 9, 1970, pp. 851-854.

Laprince-Ringuet, "Chemical Absts.", vol. 68, 1968, #52779j.

Mellor, "A Comprehensive Treatise On Inorganic & Theoretical Chemistry", vol. 5, 1946, p. 604, Longmans, Green & Co., N.Y.

Sheline et al., "Angewandte Chemie", vol. 87, 1975, pp. 332-337, (Pat. Assoc. Let. Reprint).

Butherus et al., "Journal of American Chem. Soc.," vol. 90, Mar. 1968, pp. 1715-1718.

*Primary Examiner*—Herbert T. Carter
*Attorney, Agent, or Firm*—L. Lee Humphries; Henry Kolin; Clark E. DeLarvin

[57] ABSTRACT

A new composition of matter comprising europium carboxide and method of preparing the same and other lanthanide carboxides, wherein a particulate mass of the lanthanide and carbon monoxide gas in an amount sufficient to form a lanthanide carboxide of the formula $M_2CO$, wherein M is at least one element having an atomic number of from 57 thru 71, inclusive, are introduced into a reaction zone. The reaction zone is maintained at a temperature of from about 400° to 1500° C. for a time sufficient to form the desired lanthanide carboxide.

13 Claims, No Drawings

EUROPIUM CARBOXIDE AND METHOD OF PREPARING THE SAME

This is a continuation of application Ser. No. 812,022 filed June 30, 1977 and now abandoned.

BACKGROUND OF THE INVENTION

1. Field of the Invention

Broadly, the present invention relates to compounds of the lanthanide series of elements and a method of preparing the same. More particularly, the present invention relates to a lanthanide carboxide and a method of preparing such a carboxide.

2. Background of the Invention

Refractory compounds of the rare earth or lanthanide elements and various uses for such compounds are known. U.S. Pat. No. 3,842,012, for example, discloses a method of preparing an oxide of at least one of the elements of yttrium, lanthanum and the lanthanides and discloses that such materials are luminescent and useful as a red component in the display screen of color television tubes.

U.S. Pat. No. 3,801,702 suggests certain novel compounds of europium and/or ytterbium containing tetrachalcogenides, which are useful as semiconductors and luminophors.

U.S. Pat. No. 3,723,599 discloses a technique for the growth of a single crystal of defect-free, rare earth gallium garnet. Such crystals are disclosed as being useful in magnetic domain devices, which are used extensively for information storage and propagation in the electronics industry.

U.S. Pat. No. 3,586,641 discloses a method of enhancing the superconductivity of bodycentered cubic lanthanum and yttrium sesquicarbide through formation of the sesquicarbides from ternary alloys of novel composition $(N_xM_{1-x})C_z$, where N is yttrium or lanthanum, M is thorium, any of the Group IV or VI transition metals, or gold, germanium or silicon, and z is approximately 1.2 to 1.6, and x is in the range of 0.9 to 0.25. These ternary sesquicarbides are disclosed as having superconducting transition temperatures as high as 17.0° K.

U.S. Pat. No. 3,488,286 discloses a method of producing europium oxide single crystals, which have increased electrical conductivity and curie temperatures. These materials are suggested as useful in magneto-optical and memory devices.

U.S. Pat. No. 3,219,593 suggests the use of hafnium oxide-europium oxide compounds and compositions as reactor control elements. Various rare earth subsulfide compounds are disclosed as being useful in thermoelectric elements and thermoelectric devices in U.S. Pat. No. 3,009,977. Various rare earth nitrides are suggested for use in thermoelectric generating and freezing applications in U.S. Pat. No. 3,254,493.

It is seen therefore, that rare earth compounds have many varied applications. However, in spite of the variety of such compounds known, there still is a need for new compounds which will have substantially the same or greater utility in the applications discussed hereinbefore, and which may have properties permitting their use in new applications.

SUMMARY OF THE INVENTION

In accordance with the present invention there is provided a new lanthanide compound and method of producing the same and other lanthanide carboxides. The new lanthanide compound is europium carboxide and is characterized by the exemplary formula, $Eu_2CO$. The subject europium compound is referred to herein as a carboxide to distinguish it from other compounds which may have been formed heretofore and which were in reality solid solutions of europium carbide and europium oxide. The subject europium carboxide is characterized by having a high thermal dimensional stability and relatively low chemical reactivity. There further is provided a process for producing such a carboxide and other lanthanide carboxides.

Broadly, the method comprises introducing into a reaction zone a particulate mass of at least one selected elemental lanthanide and a stoichiometric amount of carbon monoxide to form the desired carboxide. The reaction zone is maintained at a temperature of from about 400° to 1500° C. for a time sufficient to form the desired lanthanide carboxide. The exact time required will, of course, depend upon the particle size of the lanthanide as well as the temperature and carbon monoxide pressure. Generally, the time is within the range of from about 0.2 to 20 hours.

DESCRIPTION OF THE PREFERRED EMBODIMENT

The present invention relates to the production of certain new compounds of the lanthanide elements. More particularly, the present invention relates to the production of a lanthanide carboxide, which may be represented by the exemplary formula, $M_2CO$, wherein M is at least one or more lanthanide elements. The lanthanide elements contemplated herein are identified in the Periodic Table of the Elements as having an atomic number of 57 through 71, inclusive.

The lanthanide elements are known to combine with nitrogen to form metal nitrides. These metal nitrides of the stoichiometry MN (where M is a lanthanide element and N is nitrogen) have the face-centered cubic structure (Fm3m symmetry). With the exception of cerium and ytterbium, these compounds exhibit a regular decrease in lattic parameter exhibited by the lanthanide series, and hence it is thought that the metal-nitrogen bonds are somewhat ionic (H. A. Eick, "Rare Earth Boride and Nitrides" in "Rare Earth Research" Edited by E. V. Kleber, The MacMillan Company, New York, 1961).

It also is known that carbon monoxide and nitrogen are isoelectronic, however, CO and $N_2$ behave quite differently in their reaction for example with the transition metals of the Periodic Group VIB, VIIB and VIII. Carbon monoxide forms gaseous (covalent) metal carbonyls, while nitrogen reacts to form refractory and ionic metal nitrides. The alkali metals, on the other hand, combine with CO to form acetylene derivatives of the type MOC:COM, where M is an alkali metal (F. A. Cotton and G. Wilkinson, "Advanced Inorganic Chemistry," Interscience Publishers, New York, 1966).

It now has been discovered that carbon monoxide will react with euroflum to form a refractory, electrically conductive compound of the type $Eu_2CO$. This compound is called europium cartioxide to distinguish it from a mixture of metal carbides and metal oxides. The lanthanide carboxides have a face-centered cubic crystal structure like the corresponding nitrides. The lattice parameter of the carboxide is similar (with some exceptions) to the lattice parameter of the nitride. This can be seen in Table 1, where the lattice parameter of the lanthanide nitrides taken from the published literature are compared with the lattice parameter of the metal carboxides made in accordance with the present invention.

TABLE 1

COMPARISON OF LATTICE PARAMETER OF LANTHANIDE NITRIDES AND CARBOXIDES

| Element | Carboxide a(A) | Nitride a(A)* |
|---|---|---|
| La | — | 5.29 |
| Ce | 5.14 | 5.01 |
| Pr | — | 5.15 |
| Nd | — | 5.14 |
| Pm | — | — |
| Sm | 5.06 | 5.05 |
| Eu | 5.14 | 5.01 |
| Gd | 4.98 | 5.00 |
| Dy | — | 4.93 |
| Ho | — | 4.91 |
| Er | — | 4.84 |
| Tm | 4.80 | 4.81 |
| Yb | 5.22 | 4.79 |
| Lu | — | 4.77 |

*Values reported in literature.

The lattice parameter of CeN is anamolous in the series of lanthanide nitrides. From the data available at this time $Ce_2CO$ appears to show this anamoly but to a lesser extent. The carboxide of europium and ytterbium differ markedly from the expected lanthanide contraction. This is believed to be due to the electronic configuration of these atoms. Apparently europium and ytterbium exist as divalent ions in the carboxide lattice. In the case of europium, the divalent $Eu^{++}$ ion has the following electronic structure with one electron in each 4f orbital:

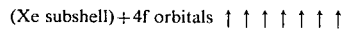

(Xe subshell)+4f orbitals ↑ ↑ ↑ ↑ ↑ ↑ ↑

This is in accordance with Hund's rule in which the state with the maximum spin quantum number S is the most stable. In the $Yb^{++}$ ion, the 4f shell is completely filled:

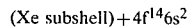

(Xe subshell)+$4f^{14}6s^2$ which lends an extra degree of stability to the electrons in their shell and makes them less available for bonding. Hence, both europium and ytterbium would have an unusually stable divalent state with respect to the other rare earths. This is reflected in the lattice parameter of Eu and Yb in combination with elements from Group VI A, i.e., oxides, sulfides, selenides and tellurides, but has not been observed in combination of the rare earth with Group V A, r.e., nitrides, phosphides, arsenides or antimonides. These compounds of europium and ytterbium are unusual in that the rare earth ion is apparently in a divalent state in combination with the carboxide.

To form a lanthanide carboxide in accordance with the present invention, the selected lanthanide should be in a substantially pure elemental form and have a median particle size of from about 5 to 500 microns and preferably from about 10 to 250 microns. It will be understood, of course, that the lanthanide may contain impurities, provided the impurities do not interfere with the desired reaction. The final carboxide product, however, will be contaminated with the impurity. It generally is preferred, therefore, that the selected lanthanide have a purity of at least about 90% and preferably at least about 99%.

A desired amount of the selected lanthanide is placed in a reaction zone in the presence of a stoichiometric amount of carbon monoxide to form the desired carboxide product. In accordance with the present invention, the reaction zone is maintained at a temperature of from about 400° to 1500° C. and preferably from about 600° to 1000° C. The pressure in the reaction zone is not critical and may range from as low as about 1 torr up to about 100 atmospheres or higher. Particularly good results have been obtained, however, when the pressure is maintained within a range of from about 50 torr to 5 atmospheres.

The time required to obtain substantially complete reaction will vary, of course, with temperature, pressure and particle size of the lanthanide, as well as the specific lanthanide selected. The time required for any given set of conditions is readily determinable by experimentation. For example, the pressure within the reaction zone may be monitored, and as the reaction proceeds the pressure within the reaction zone will gradually decrease as the carbon monoxide reacts and is bound with the lanthanide. Thus, once the pressure stops decreasing, it generally may be safely assumed that the reaction is complete. Generally, when the aforesaid particularly preferred conditions and particle size are utilized, the reaction is complete within a time of from about 0.2 to 20 hours.

The present invention can be more readily understood with reference to the following example, which is illustrative only, and should not be construed as limiting the present invention. There are numerous types of equipment known to those skilled in the art, which are suitable for practicing the present invention as well as other techniques which are equally suitable for reacting the selected lanthanide and carbon monoxide. Further, it is well within the skill of those versed in the art to vary or optimize the specific operating parameters disclosed herein.

EXAMPLE

Various lanthanide carboxides ($M_2CO$) were prepared by reacting the selected lanthanide element in finely divided form with CO at elevated temperatures. The lanthanide in a finely divided form of about 250 microns or smaller was reacted with gaseous carbon monoxide in the absence of other reactive gases. A set of the experimental parameters, temperatures and initial CO pressures are given in Table 2.

TABLE 2

EXPERIMENTAL PARAMETERS OF PRESSURE AND TEMPERATURE USED IN THE PREPARATION OF LANTHANIDE CARBOXIDES

| Lanthanide Element | Initial CO Pressure (torr) | Reaction Temperature (°C.) |
|---|---|---|
| Ce | 252 | 635–675 |
| Sm | 214 | 600–660 |
| Eu | 380 | 835–850 |
| Gd | 515 | 892–100 |
| Tm | 53 | 820–905 |
| Yb | 513 | 832–889 |

The initial reaction rate generally is about 10% of the CO per hour at these conditions. The reaction rate falls off in an approximately parabolic fashion. Apparently the refractory metal carboxide formed on the surface of the lanthanide acts as a diffusion barrier and slows down the rate of the reaction as the reaction proceeds. This effect is diminished by use of a finely divided lanthanide reactant.

The initial temperature given in Table 2 is that for which the initial reaction rate of the CO was about 10% per hour. As the reaction rate slowed down, typically when from 70% to 90% of the CO has reacted, then the temperature was raised to the second value given in Table 2, to speed up the rate of the reaction and thus diminish the time required for completion of the reaction. The range of pressures employed included initial CO pressures of from 53 torr in the case of thulium to 515 torr in the case of gadolinium. In the tests cited in Table 2, the CO pressure approaches zero with consumption of the lanthanide.

In another illustrative example, samarium carboxide ($Sm_2CO$) was prepared in which the carbon monoxide pressure was held constant at a pressure of 740 torr. The weight gain experienced corresponded to that expected from the stoichiometry $Sm_2CO$, i.e., a sample of samarium consisting of particles about 60 mesh and weighing 0.600 g was reacted at from 600° to 660° C. with CO at atmospheric pressure. The weight of the product was 0.654 g as compared to a theoretically expected amount of 0.656 g.

The lattice parameters of lanthanide carboxides ($M_2CO$) produced are given in Table 1. The compounds have the sodium chloride or face-centered cubic structure. The materials are refractory, for example, samarium carboxide was heated to a temperature of 1500° C. without any evidence of melting or appreciable weight loss. Pellets or cylinders of samarium carboxide ($Sm_2CO$) approximately $\frac{1}{4}$ inch in diameter by $\frac{3}{4}$ inch in length have been fabricated by hot-pressing sintering techniques. Densities of 90% of the theoretical density of $Sm_2CO$ have been achieved at a temperature of about 1400° C. and a pressure of about 5000 psig. The specimens of $Sm_2CO$ so prepared exhibit an electrical resistivity of about 2 milliohm-cm, at 25° C. and at 500° C. the electrical resistivity is about 3 milliohm-cm.

While the present invention has been described with respect to what at present are considered to be preferred embodiments thereof, it will be understood that changes, substitutions, modifications and the like may be made therein without departing from the scope of the invention as defined in the claims.

What is claimed is:

1. A composition of matter comprising a europium carboxide represented by the formula, $Eu_2CO$.

2. A method of preparing a lanthanide carboxide having the general formula, $M_2CO$, wherein M is at least one lanthanide element having an atomic number of from 57 through 71, inclusive, comprising introducing into a reaction zone a particulate mass of at least one selected elemental lanthanide and carbon monoxide in an amount sufficient to provide about the stoichiometric amount to form the carboxide and in the absence of other reactive gases, and maintaining a temperature in the reaction zone of from about 400° to 1500° C., for a time sufficient to form the desired lanthanide carboxide and recovering the lanthanide carboxide.

3. The method of claim 2, wherein the reaction zone is maintained at a temperature of from about 600° to 1000° C.

4. The method of claim 3, wherein the particulate mass of elemental lanthanide has a median particle size of from about 5 to 500 microns.

5. The method of claim 2, wherein the pressure within the reaction zone is maintained within a range of from about 50 torr to about 5 atmospheres.

6. The method of claim 2, wherein the selected elemental lanthanide has a median particle size of from about 10 to 250 microns.

7. The method of claim 6, wherein the temperature within the reaction zone is maintained within the range of from about 600° to 1000° C.

8. The method of claim 7, wherein the pressure within the reaction zone is maintained within a range of from about 50 torr to about 5 atmospheres.

9. A method of preparing a lanthanide carboxide having the general formula $M_2CO$ wherein M is at least one lanthanide element having an atomic number of from 57 through 71, inclusive, comprising introducing into a reaction zone a particulate mass of one selected elemental lanthanide and carbon monoxide in an amount sufficient to provide about the stoichiometric amount to form carboxide and in the absence of other reactive gases, reacting the lanthanide and carbon monoxide at a temperature of from about 400° to 1500° C. and at a pressure of from one torr to 100 atmospheres for a time of from about 0.2 to 20 hours and sufficient to form the lanthanide carboxide and recovering the lanthanide carboxide.

10. The method of claim 9 wherein the reaction zone is maintained at a temperature of from about 600° to 1000° C.

11. The method of claim 10 wherein the particulate mass of elemental lanthanide has a median particle size of from about 5 to 500 microns.

12. The method of claim 11 wherein the pressure within the reaction zone is maintained within a range of from about 50 torr to about 5 atmospheres.

13. The method of claim 12 wherein the selected elemental lanthanide has a median particle size of from 10 to 250 microns.

* * * * *